No. 650,378. Patented May 29, 1900.
W. B. H. DOWSE.
BUTTON FASTENER.
(Application filed Jan. 26, 1897.)
(No Model.)
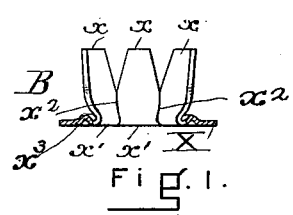
Fig. 1.
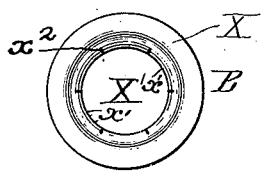
Fig. 2.
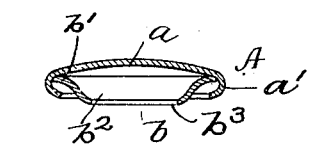
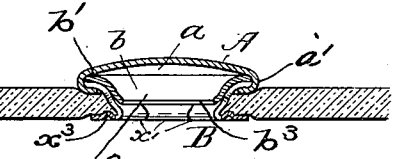
Fig. 4.
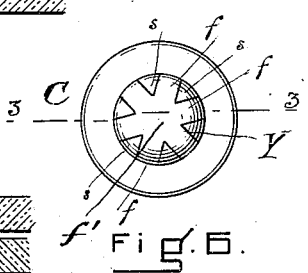
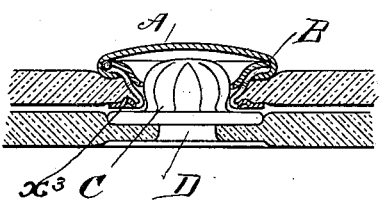
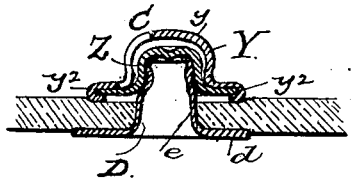
WITNESSES
A. N. Flannery.
Geo. A. Holmes
INVENTOR
W. B. H. Dowse
THE NORRIS PETERS CO., PHOTO-LITHO., WASHINGTON, D. C.

UNITED STATES PATENT OFFICE.

WILLIAM B. H. DOWSE, OF NEWTON, MASSACHUSETTS, ASSIGNOR TO THE CONSOLIDATED FASTENER COMPANY, OF PORTLAND, MAINE.

BUTTON-FASTENER.

SPECIFICATION forming part of Letters Patent No. 650,378, dated May 29, 1900.

Application filed January 26, 1897. Serial No. 620,813. (No model.)

*To all whom it may concern:*

Be it known that I, WILLIAM B. H. DOWSE, a citizen of the United States, residing at Newton, in the county of Middlesex and Commonwealth of Massachusetts, have invented a new and useful Improvement in Button-Fasteners, of which the following is a full specification.

This invention relates to separable fasteners of that class having a stud member and a socket member; and the purpose of the same is to improve devices of this character in construction and operation.

The invention consists of a resilient stud member and a resilient socket member of particular form and aggroupment of the parts, as will be more fully hereinafter described and claimed.

In the accompanying drawings, Figure 1 is a vertical section of a socket-piece forming part of the socket member. Fig. 2 is a bottom plan view of the same. Fig. 3 shows central detail cross-sections of the respective parts of the socket member as they are commercially sold. Fig. 4 is a cross-sectional view of the parts of the socket member united. Fig. 5 is a view similar to Fig. 4, with the stud member applied. Fig. 6 is a top plan view of the stud member. Fig. 7 is a section of the line 3 3, Fig. 6, showing the separated parts of the stud member as commercially sold. Fig. 8 is a view similar to Fig. 7, showing the parts of the stud member united and fixed to a fabric.

The improved socket member consists of the cap A and socket-piece B, the cap including the shell $a$ and anvil $b$. The anvil $b$ consists of a flaring annulus having the central opening $b^3$, adapted to receive the head of the button member, which is engaged by the contracted edges $b^2$ of the annulus, and about the upper edge of the annulus is an annular flange $b'$, adapted to extend into and engage with the annular turned-in flange $a'$ of the cap A, between which turned-in flange $a'$ and the flange $b'$ the upper peripheral edge of the socket-piece B is held, as seen in the drawings. As shown, the anvil $b$ is flared in gradually-compound contact.

The socket-piece B constitutes a means for securing the socket member in position, as well as a resilient throat for the entrance and engagement of the stud member, and consists of a ring or base-plate X, having upright fingers $x$ $x$, &c., extending upward from the inner edge of the ring. These fingers have lower rolls $x'$ closely adjacent to the base-plate, and are separated their entire length by divisional slits or cuts $x^2$, extending slightly into the surface of the base-plate, as shown in Fig. 2. The fingers $x$ are partially dished outward and flared immediately above the rolled-in lower portions thereof, and in the base-plate an annular bead $x^3$ is formed, which strengthens the said plate and also materially assists in securing the socket member and in assembling the parts thereof.

In assembling the parts of the socket member the arms $x$ are passed through the fabric or material to which the device is to be secured from one side and into the seat between the flange $a'$ and anvil $b$ of the cap A, disposed on the opposite side of the fabric. The arms $x$ in effecting the union of the parts are forced to follow the contour of the anvil against which they are brought to bear, and in the operation are flared outward to a greater extent than primarily arranged, so that both the socket-piece B and cap A become interlocked and partially exposed for relative operation on opposite sides of the fabric or material. Thus a contracted resilient opening or throat X' is formed by the lower cut rolls $x'$ of the arms $x$, and above the opening an enlarged chamber is provided to removably receive a resilient stud member.

The resilient stud member consists of the section C, (shown in Fig. 7,) composed of the exterior stud-piece Y, hollow globular anvil Z, and attaching-eyelet D. The head Y is formed from one piece of sheet metal having an enlarged spherical head portion $y$, the rolled-in contracted base-neck $y'$, and an annular base-flange $y^2$, with an inturned periphery to provide a holding means. In the head portion $y$ arms $f$ are cut and radiate from a continuous central top $f'$ and integral at their lower ends with the base-flange $y^2$. Between these arms $f$ angular fingers $s$ are formed and fill the intervening spaces, both the arms and fingers being brought up equally or provided with equal and merging rotundity, so that the head $y$ has practically the appearance of a solid stud with a smooth exterior, the separations between the arms $f$ and fingers $s$ showing simply as lines upon the surface. By this means the external working part of the stud member is made resilient and contractible to pass through a smaller opening than its normal extended limits.

The anvil Z has an enlarged chamber $z$ with a contracted opening $z'$ and an annular base-flange $z^2$, which is placed against the under side of the flange $y^2$ of the exterior stud-piece and retained in connection with the latter by the inturned portion of said flange $y^2$. The anvil fits in and is of less dimension than the head portion $y$ of the stud-piece, so that interference with the resilient action of said head portion $y$ will be avoided. To secure the connected exterior stud-piece Y and anvil Z to the fabric, the eyelet D is utilized, and comprises a base-flange $d$ and shank $e$. The shank is inserted through an opening in the fabric and into the anvil and upset within the latter when the said parts are pressed together, as indicated in Fig. 8 of the drawings.

When the two members of the fastener, carried by separate portions of the fabric, are drawn together, the head portion $y$ of the stud member Y is forced into the socket member through the contracted resilient opening $X'$ of the socket-piece B and into the enlarged chamber formed by the cap A and anvil $b$. The contracted neck $y'$ of the head $y$ of the stud member is engaged by the resilient beads or rolls $x'$ of the fingers $x$ of the socket-piece B and grip the said part of the stud member with sufficient firmness to resist any tendency to separation due to strain or force incident to the tension of the connected parts of the fabric on which the fastener is mounted, but at the same time readily yielding to efforts applied to regularly disconnect the same.

I claim—

1. A fastener for clothing and other articles consisting of a socket member and a stud member, the socket member provided with a socket-piece consisting of a base-plate centrally perforated and having attaching-fingers, the lower end of each of said fingers being formed with inwardly-directed heads within the central perforation to form a resilient base, and the division of the fingers extending slightly into the base-plate or rolled portion thereof.

2. A fastener for clothing and other articles, consisting of a socket member and a stud member, one member provided with a cap formed with an annular inturned flange and an anvil with an annular flange to engage in the inturned flange of the cap, and a socket-piece having a base and upright fingers rolled in close to the base-plate and separated their entire length, the division extending slightly into the base, said fingers being inserted in the annular inturned flange of the cap between the inturned flange of the cap and the flange of the anvil.

3. A fastener for clothing and other articles, consisting of a socket member and a stud member, the stud member being provided with a stud-piece, having a head formed by the arms $f$ joined at the top and bottom, and the fingers $s$ filling the space between the said arms, causing the stud to have a practically-solid appearance, the arms and fingers having an equal and merging rotundity and forming a smooth exterior surface, substantially as shown and described.

4. A fastener for clothing and other articles, consisting of a female member, and a male member having a spring stud-piece with a head formed of spring-arms $f$, united at each end and forming an integral piece, and resilient fingers intermediate of said arms, substantially as described.

5. A separable fastener consisting of a socket member and a stud member having a head formed with resilient arms joined at top and at the bottom integral with an annular base, and fingers intermediate of the arms, the arms and fingers being resilient and forming a smooth exterior surface.

6. A separable fastener consisting of a socket member and a stud member, the socket member comprising a cap formed with a peripheral downward and inturned flange, an anvil arranged in said cap having a flaring flange arranged in the recess of the inturned flange and a lower contracted portion, and a socket-piece formed with a base-flange having fingers extending upward from the inner edge portion thereof the portions of the fingers adjacent to their bases being formed with a bead and the cuts extending a distance into the flange to provide a contracted yielding throat to receive and retain a stud member, the said fingers being inserted and retained in the inturned flange between the anvil and cap-flange.

7. A separable fastener consisting of a socket member and a stud member, the socket member comprising a cap with a peripheral inturned flange, a flaring anvil having its upper flaring flange disposed in said inturned flange, and a lower contracted portion, and a socket-piece having a base-flange formed with fingers extending upward from the inner portion thereof, the parts of said fingers at their bases being formed with beads, and the slits between the fingers extending part way into the base to form a contracted yielding and resilient opening to receive the stud member, and the said fingers being retained between the anvil and cap-flange, and a stud member comprising a head formed with arms joined at top and at the bottom integral with a base-flange and intermediate fingers between the arms, said fingers and arms being resilient and having an equal and merging rotundity, forming a practically-smooth exterior surface.

In witness whereof I have hereunto set my hand.

WM. B. H. DOWSE.

Witnesses:
L. A. STACKPOLE,
A. H. FLANNERY.